(12) United States Patent
Wu et al.

(10) Patent No.: US 12,416,201 B2
(45) Date of Patent: Sep. 16, 2025

(54) SHADING DEVICE

(71) Applicant: ECOLE POLYTECHNIQUE FEDERALE DE LAUSANNE (EPFL), Lausanne (CH)

(72) Inventors: Yujie Wu, Ecublens (CH); Jérôme Henri Kämpf, Corcelles-Prés-Concise (CH); Jean-Louis Scartezzini, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 588 days.

(21) Appl. No.: 17/263,266

(22) PCT Filed: Apr. 17, 2019

(86) PCT No.: PCT/IB2019/053199
§ 371 (c)(1),
(2) Date: Jan. 26, 2021

(87) PCT Pub. No.: WO2020/021347
PCT Pub. Date: Jan. 30, 2020

(65) Prior Publication Data
US 2021/0140232 A1 May 13, 2021

(30) Foreign Application Priority Data
Jul. 26, 2018 (DE) .......................... 102018005890.6

(51) Int. Cl.
*E06B 9/38* (2006.01)
*E06B 9/24* (2006.01)
(Continued)

(52) U.S. Cl.
CPC .................. *E06B 9/38* (2013.01); *E06B 9/32* (2013.01); *H04N 7/18* (2013.01);
(Continued)

(58) Field of Classification Search
CPC ...... E06B 9/38; E06B 9/32; E06B 2009/2417; E06B 2009/2464; E06B 2009/6818;
(Continued)

(56) References Cited

U.S. PATENT DOCUMENTS 10,316,581 B1 * 6/2019 Nagel .................. E06B 9/24
11,719,990 B2 * 8/2023 Zedlitz ................. G02F 1/163
359/275

(Continued)

FOREIGN PATENT DOCUMENTS

CN 205502981 U * 8/2016
JP 2007100479 A 4/2007
(Continued)

OTHER PUBLICATIONS

Christian, "Simple tool to evaluate the impact of daylight on building energy consumption", 2008 (Year: 2008).*
(Continued)

*Primary Examiner* — Bickey Dhakal
(74) *Attorney, Agent, or Firm* — Taft Stettinius & Hollister LLP; Stephen F. Rost

(57) ABSTRACT

A shading device is configured to be integrated into a façade of a building. The shading device includes an imaging system configured to create images of an outside view of the building.

13 Claims, 4 Drawing Sheets

(51) Int. Cl.
  *E06B 9/32* (2006.01)
  *E06B 9/68* (2006.01)
  *H04N 7/18* (2006.01)
(52) U.S. Cl.
  CPC ............... *E06B 2009/2417* (2013.01); *E06B 2009/2464* (2013.01); *E06B 2009/6818* (2013.01)
(58) Field of Classification Search
  CPC . E06B 9/24; H04N 7/18; B60J 1/2088; H02P 8/00; H02P 8/02
  See application file for complete search history.

(56) References Cited

U.S. PATENT DOCUMENTS

| | | | |
|---|---|---|---|
| 2008/0170754 A1* | 7/2008 | Kawasaki | G06V 20/584 382/104 |
| 2015/0129140 A1 | 5/2015 | Dean et al. | |
| 2016/0007426 A1 | 1/2016 | Ashdown et al. | |
| 2018/0187484 A1 | 7/2018 | Hebeisen et al. | |
| 2018/0252035 A1* | 9/2018 | Casey | E05F 15/77 |
| 2019/0257686 A1* | 8/2019 | Popat | G01J 1/0266 |
| 2020/0236299 A1* | 7/2020 | Arai | G06T 7/11 |
| 2021/0149080 A1* | 5/2021 | Wu | H04N 23/698 |
| 2022/0113688 A1* | 4/2022 | Wan | G05B 13/048 |

FOREIGN PATENT DOCUMENTS

| | | | |
|---|---|---|---|
| WO | WO2013140292 A2 | 9/2013 | |
| WO | WO-2017188318 A1 * | 11/2017 | ............. E06B 9/264 |
| WO | WO2017189437 A1 | 11/2017 | |

OTHER PUBLICATIONS

Chinese Office Action for Chinese Application No. 201980049713.8 dated Mar. 31, 2022 (9 pages).
International Search Report for International Application No. PCT/IB2019/053199 dated Oct. 24, 2019 (3 pages).
Written Opinion for International Application No. PCT/IB2019/053199 dated Oct. 24, 2019 (7 pages).

* cited by examiner

SHADING DEVICE

TECHNICAL FIELD

The disclosure relates to a shading system, and furthermore relates to a facade.

BACKGROUND

Among the many energy consuming domains, the building sector is responsible for a considerable fraction of total consumption. Lighting is one of the leading consumers representing 15%-35% of the energy demand in commercial buildings despite of its high electricity saving potential. As a freely available resource, daylight utilization can contradict the energy saving objective if it is not harnessed smartly. During hot seasons, large solar heat gain induced by excessive penetration of sun light can cause a substantial upsurge in the cooling load of buildings. Although shading systems offer a measure for regulating sunlight influx, the utilization of daylight is largely dependent on occupants' behavior. Once visual comfort was disturbed by glare due to the penetration of sunlight and occupants have therefore taken measures to avoid glare, such as closing a shading system, occupants tend to be reluctant in reopening the shading system, even if the disturbance has passed, thereby occluding the daylighting.

The currently available automated blinds can be generalized as follows: For a decentralized system (e.g. a single office room), the majority of existing automated blinds, up until now, are based on the measurement of horizontal or vertical work-plane illuminance inside the room. Based on a feedback loop, the position or tilt angle of the blinds is adjusted to make the illuminance on the monitored desk reach a certain threshold. However, the oscillation problem of a closed-loop system remains an issue and optimal positions of sensors inside a room are difficult to determine. Furthermore, since installing indoor sensors involves wiring work or even refurbishment labor, such inconvenience might be another impeding factor for users' acceptance of automated blinds. For a centralized system (e.g., large scale office buildings), the control of groups of blinds is, in general, systematically designed and the sun position is gauged by photometers, or a pyranometer, installed on the roof as input for a centralized computer to assess and analyse. Combined with temperature and illuminance sensation in each single chamber, the automated blinds perform in a satisfactory way in artificial lighting, whereas, it is not easy to take into consideration the particular position of each room to evaluate glare risk for occupants.

Daylighting, as a free source of illumination, not only has a significant potential in energy saving in lighting, heating, and cooling but also contributes to improvement of occupants' working efficiency and health. Optimizing the daylighting utilization and, at the same time, ensuring occupants' visual comfort is a challenging task for many shading controllers. Traditional controllers for shading systems use ceiling sensors or ceiling cameras with a limited sensing area. Such traditional shading control systems typically have difficulties to find the optimal shading position or at least have to put up a considerable effort to do so. Furthermore, such traditional shading control systems typically comprise a multitude of devices inside the building which need to be installed and interconnected, thus inducing a considerable installation difficulty. Furthermore, when cameras are used inside buildings, such as office buildings, privacy issues might arise.

SUMMARY

It is an object of the disclosure, per an embodiment, to solve or to at least diminish the above-mentioned disadvantages.

This problem is solved, per an embodiment, by a shading device configured to be integrated into a facade of a building, where the shading device comprises an imaging system configured to create images of an outside view of the building. In this context, the expression "outside view" is to be understood such that it typically comprises a sky portion and a landscape portion, wherein the sky portion typically comprises for example a sun and/or clouds and/or an at least partly overcast sky and/or an at least partly clear sky, wherein the landscape portion typically comprises for example other buildings and/or parts thereof and/or landmarks and/or trees and/or any other types of objects. When the shading device is mounted on a facade, the imaging device is thus typically looking outside the building on the facade of which the shading device is installed instead of taking images of the inside of this building. Like this, the imaging system can acquire information concerning lighting conditions in real time, and automated control strategies for controlling the shading system can be based on this information. As a result, no measurements are necessary inside the building. The shading device typically has a front side and a back side, wherein the back side is configured to be attached to a facade, wherein the imaging system is integrated in the front side and is directed in the direction opposite the back side.

In some embodiments, the imaging system is integrated in the shading device. The imaging system can therefore also be referred to as integrated imaging system or embedded photometric device (abbreviated EPD). Such an EPD has the advantage, per an embodiment, to facilitate the installation of the shading system on a facade, because the shading system can be installed as is and no further installations are necessary. Alternatively, it is also possible that the imaging system is attached to the shading device separately, for example by means of screws or the like, for example once the shading system is installed on the facade.

In some embodiments, the imaging system is configured to exclusively create images of the outside of the building when the shading device is installed on the building facade. This has the advantage, per an embodiment, that no privacy issues arise for people inside the building, for example for office workers.

In some embodiments, the shading device comprises a Venetian blind, wherein the Venetian blind comprises a multitude of slats. Venetian blinds are shading systems comprising slat elements, typically made from metal, plastic or fabric. They can be installed inside a building or outside the building, i.e. on the exterior of a building facade. In Venetian blinds, the slats are typically arranged essentially horizontally and are tiltable around their longitudinal axes which are typically also aligned essentially horizontally (that is, when the Venetian blind is installed on a building facade). By means of tilting of the slats, more or less shading is achieved for a room adjacent to the shading system. Alternatively or in combination with that, the shading device can comprise other blind types, for example with vertical blinds.

In some embodiments, the shading device comprises a stepper motor, wherein the stepper motor is configured to tilt the slats of the Venetian blind around their respective longitudinal axes, wherein the stepper motor is configured to reach a tilt angle resolution of 10 degrees or less in an example, 5 degrees or less in another example, more 3 degrees or less in yet another example. This means that by each step that the stepper motor is taking, the slats are tilted by 10 degrees or 5 degrees or 3 degrees, depending on the chosen tilt angle resolution. Alternatively, a less granular tilt angle resolution, for example 15 degrees, or yet a finer tilt angle resolution, for example 1 degree, can be chosen.

In some embodiments, the shading device comprises a reduction gearbox and a rotatory axis, wherein the slats are mechanically connected to the rotatory axis, by means of a multitude of strings and/or chains, wherein the reduction gearbox is arranged between a drive shaft of the stepper motor and the rotatory axis, such as to reduce a rotation angle of each step of the stepper motor to a smaller rotation angle of the rotatory axis.

In some embodiments, the imaging system comprises a lens and/or optical filters and/or an image sensor and/or a processor and/or an internal memory, wherein the imaging system is configured to determine a directional luminance distribution of the outside view, wherein the imaging system is configured to simulate a work-plane illuminance inside a target room behind the shading device, and/or wherein the imaging system is configured to evaluate a glare risk for occupants inside the target room, and/or wherein the imaging system is configured to determine an optimal slate position which provides an optimal trade-off between work-plane illuminance and glare risk and/or view outside. In some embodiments, the imaging system comprises a multitude of processors. In some embodiments, the imaging system is configured to use a predefined model of an adjacent target room and/or building to simulate the work-plane illuminance and/or to evaluate the glare risk, whereby the imaging system is configured to carry out raytracing simulations for the simulation and/or evaluation. The term "target room" relates to a room on the window of which is installed the shading device according to the disclosure.

In some embodiments, the shading device comprises an electrochromic glazing. In this case, the imaging system and/or the shading device is configured to apply a voltage to the electrochromic glazing to control an opacity and/or transmittance of the electrochromic glazing and thereby provide an optimal trade-off between work-plane illuminance and glare risk. In some embodiments, the shading device comprises at least one Venetian blind and/or at least one electrochromic glazing and/or at least one fabric roller blinds, wherein the Venetian blind and/or the electrochromic glazing preferably share the same imaging system. Alternatively, each Venetian blind and/or each electrochromic glazing can comprise its own imaging system and/or a certain group of Venetian blinds and/or electrochromic glazings and/or shading systems can use a certain group of imaging systems.

A facade according to the disclosure comprises a shading device according to the disclosure. In some embodiments, the facade is a building facade. In some embodiments, the facade comprises a multitude of shading devices. In typical embodiments, the facade comprises one or more Venetian blind(s) and/or one or more electrochromic glazing(s) and/or one or more imaging system(s) and/or one or more processors. In some embodiments, the facade and/or the shading device is configured to participate in the internet of things. In some embodiments, the shading device is installed on a vehicle (in this case, the term "facade" does not refer to a building facade but rather to a body shell of a vehicle).

A method for illumination control, for controlling a lighting system of a building, uses a shading device according to the disclosure, wherein the method comprises an outside view calculation phase, and/or an illuminance calculation phase, and/or a glare evaluation phase, and/or a shading determination phase, and/or a shading system adjustment phase, wherein the different phases are periodically repeated, by means of an infinite loop.

BRIEF DESCRIPTION OF THE FIGURES

In the following, the disclosure is described in detail by means of drawings, wherein show.

DETAILED DESCRIPTION

Figure 1:
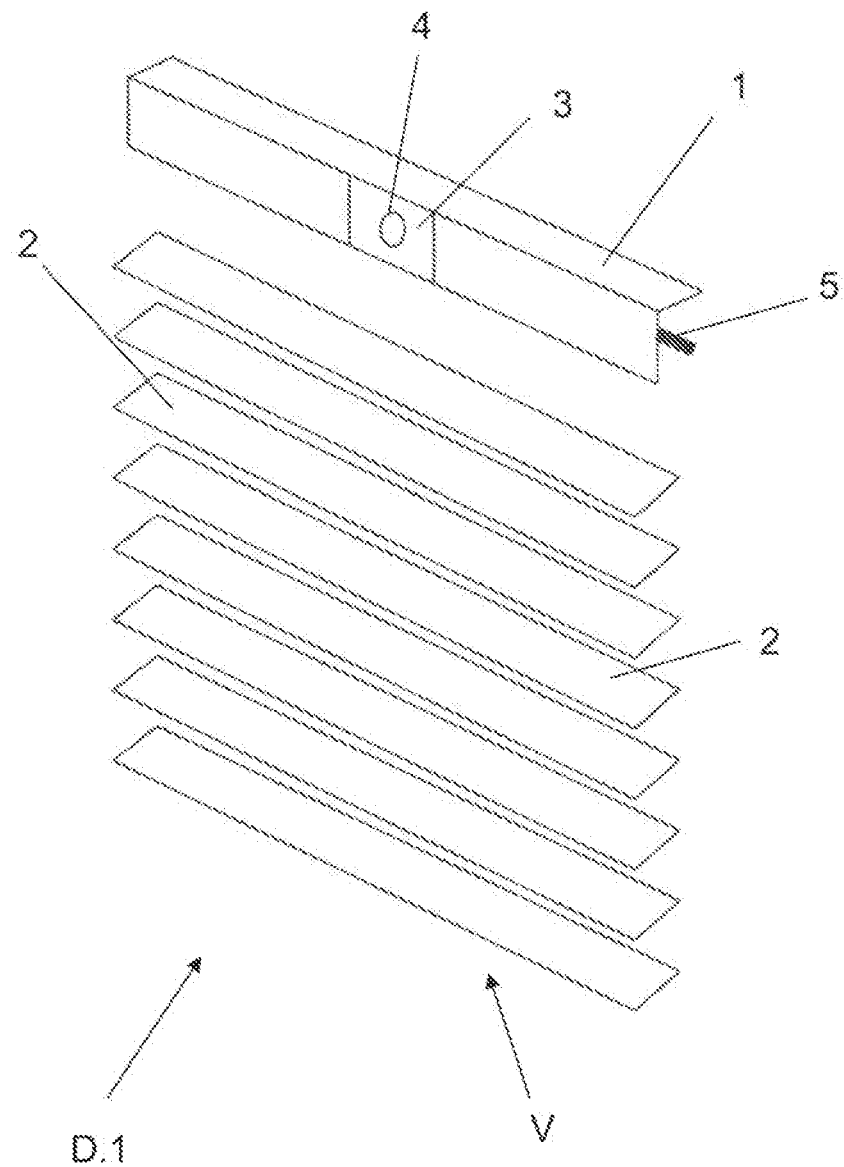
FIG. 1: Schematic view of a shading device according to one embodiment of the disclosure (Venetian blind embodiment)

FIG. 1 shows a schematic view of a shading device D.1 according to one embodiment of the disclosure. In the embodiment shown in FIG. 1, the shading device D.1 comprises a Venetian blind V. In the case shown in FIG. 1, one could even say that the shading device D.1 is formed by the Venetian blind V. The Venetian blind V comprises a shading shell 1, a multitude of slats 2 (only two are marked with reference signs for the sake of simplicity), an imaging system 3 which comprises a lens 4, and a rotatory axis 5.

The shading shell 1 houses the rotatory axis 5 and is furthermore configured to house the slats 2. The slats 2 are linked to the rotatory axis 5 by means of strings or chains which are not shown in FIG. 1 for the sake of simplicity. By rotating the rotatory axis 5, the slats 2 can be completely retracted into the shading shell 1 (this is referred to as the fully opened position of the shading device) or can be lowered (as shown in FIG. 1). When the slats 2 are lowered and a further rotation of the rotatory axis 5 is carried out, the slats 2 simultaneously carry out a rotation movement around their respective longitudinal axes (not indicated in FIG. 1) which are parallel to the rotatory axis 5. The imaging system 3 is integrated in the shading shell 1 and looks towards the outside of a building onto which the shading device D.1 is to be installed (not shown in FIG. 1), that is, away from a facade (not shown). Like this, the imaging system 3, of which also a lens 4 is visible in FIG. 1, can take pictures of an outside scene comprising parts of a sky and a landscape, can carry out calculations for generating luminance maps, sky matrices and the like and can then control the slats 2 of the Venetian blind V such as to optimize the lighting conditions in a room (not shown in FIG. 1) to which the shading device D.1 is attached, in particular to optimize the workplane illuminance and/or the glare risk in such a room. To do so, the imaging system can make use of a computer model of the room which might be stored in a memory of the imaging system 3, and carry out lighting simulations, for example ray-tracing computations, by means of an internal processor. The slats 2 are then for example brought into an inclined position that corresponds to the optimized lighting conditions calculated by the imaging system 3.

Figure 2:
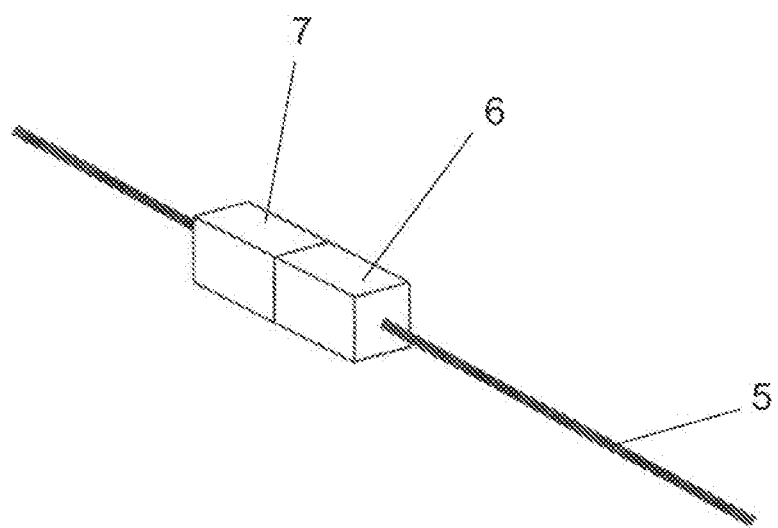
FIG. 2: Schematic view of an actuator system for the shading device of FIG. 1, FIG. 3: Schematic view of a shading device according to another embodiment of the disclosure (electric glazing embodiment)

FIG. 2 shows a schematic view of an actuator system for the shading device D.1 shown in FIG. 1. The actuator system comprises a stepper motor 6 and a reduction gearbox 7. The reduction gearbox 7 establishes a mechanical link between the stepper motor 6 and the rotatory axis 5. In some embodiments, the stepper motor 6 is a DC motor and/or is configured to rotate its drive shaft in steps. For each step, the reduction gearbox reduces the rotation of the stepper motor 6 so that a rotation angle of the rotatory axis 5 is smaller than a rotation angle of the drive shaft of the stepper motor 6 for each step.

Figure 3:
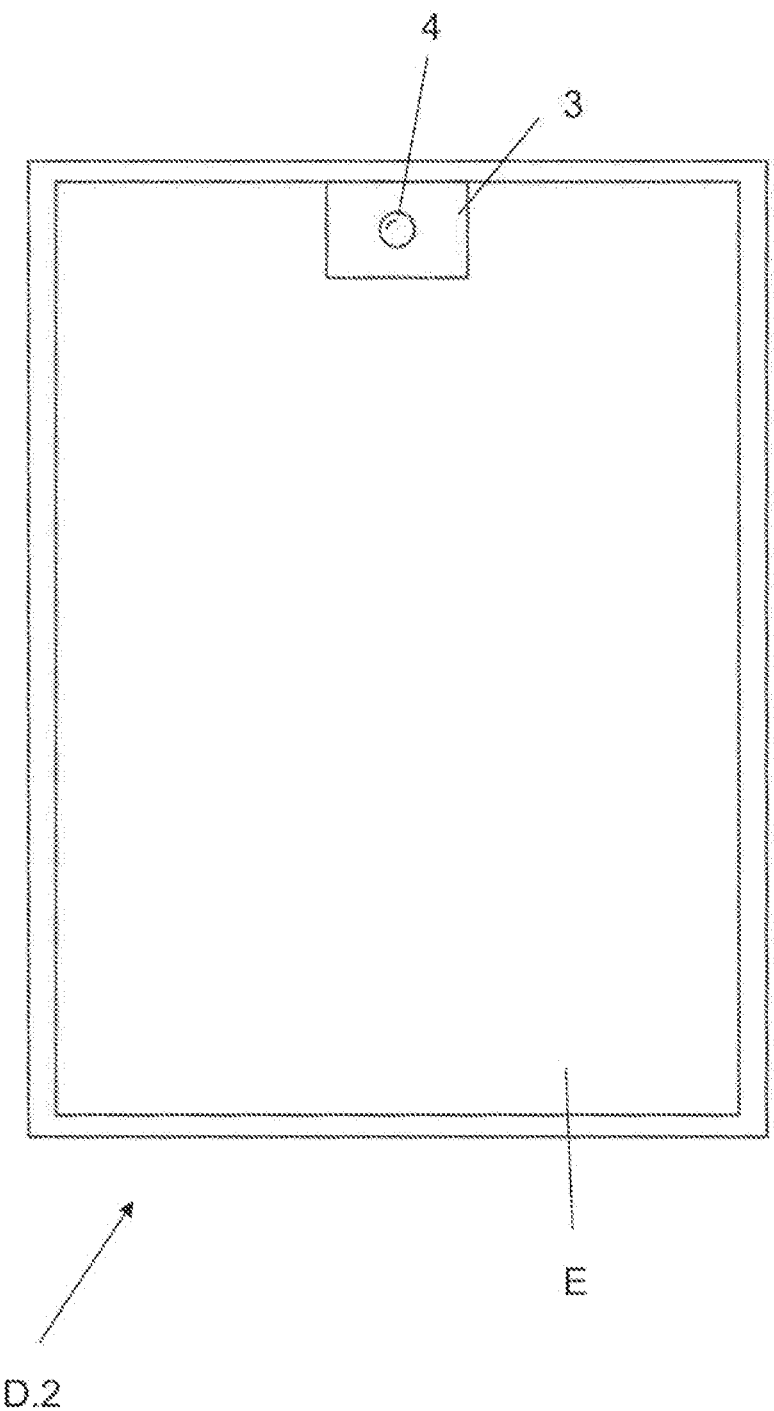

FIG. 3 shows a schematic view of a shading device D.2 according to a second embodiment of the disclosure. In the embodiment shown in FIG. 3, the shading device D.2 comprises an electrochromic glazing E. Just as in the first embodiment with the Venetian blind V, the shading device D.2 in FIG. 3 comprises an integrated imaging system 3 with a lens 4. The imaging system 3 in the shading device D.2 works very much like the imaging system 3 in the shading device D.1 except for that it does not calculate optimal inclination angles/rotation angles for slats (which are of course not present in this embodiment) but rather optimal opacities and/or transmittance of the electrochromic glazing E in order to achieve the desired illuminances and glare risks in an office room. Accordingly, the imaging system 3 does not actuate a stepper motor in this embodiment but rather sets a voltage that corresponds to a certain opacity and/or transmittance of the electrochromic glazing E. The imaging system 3 is arranged on the top rim of the shading device D.2. This may have the advantage, per an embodiment, that the imaging device 3 does not obstruct a view through the electrochromic glazing E. In another embodiment, the imaging system 3 could also be arranged on the bottom rim of the electrochromic glazing 3.

Figure 4:
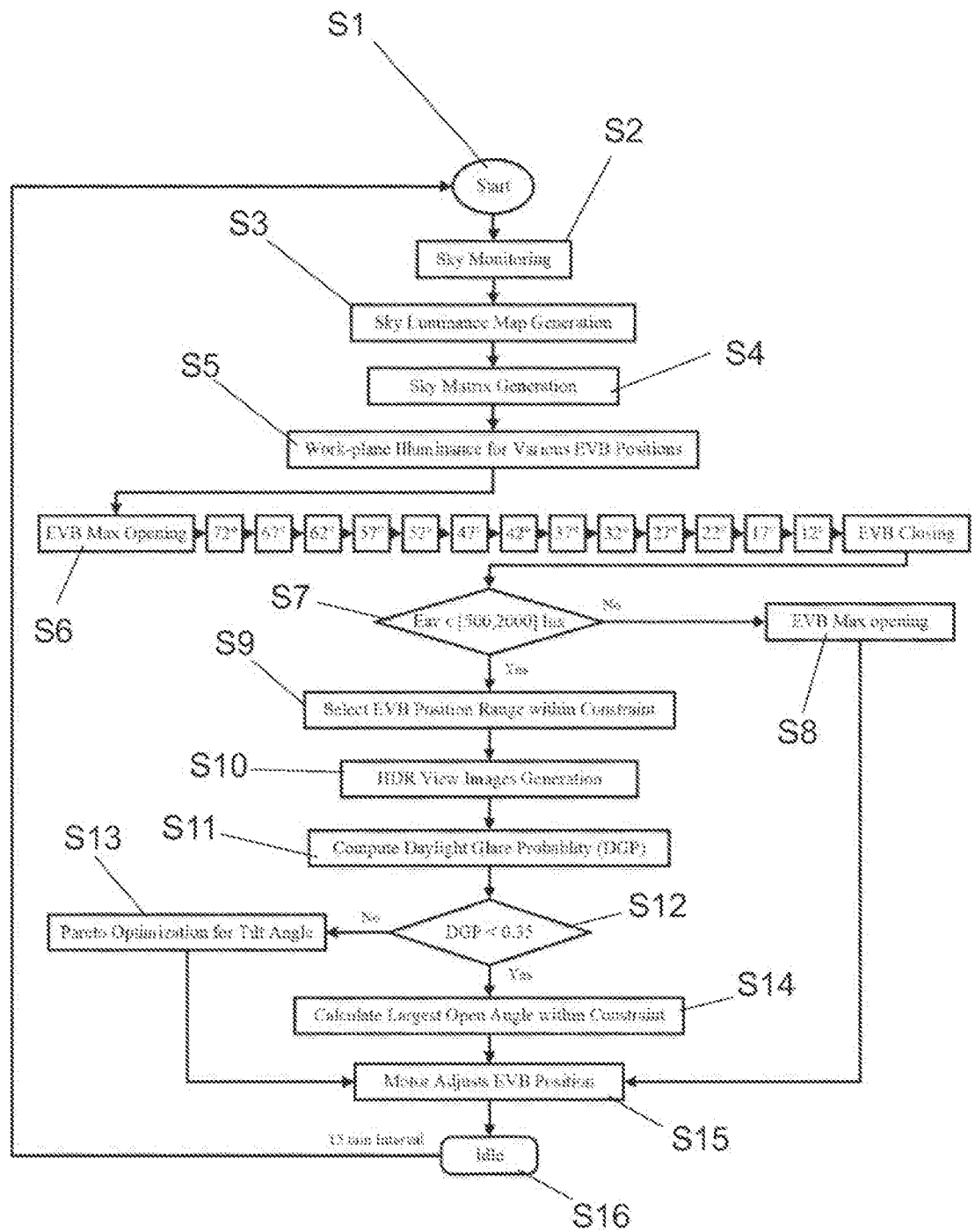
FIG. 4: Flow chart of a method for illumination control according to the disclosure.

FIG. 4 shows a flow chart of a method for illumination control according to the disclosure. The method starts at start step S1. Start step S1 is followed by a series of further steps, namely a sky monitoring step S2, a sky luminance map generation step S3 and a sky matrix generation step S4.

The imaging system or EPD firstly starts to capture images of the sky and landscape, with the spectrally corrected imaging system and maps the directional luminance distribution ($3 \times 10^9 \sim 10^2$ cd/m$^2$ or $5 \times 10^9 \sim 10^1$ cd/m$^2$) of the sky vault, including the sun, clouds, sky background, and landscape, including surrounding buildings and vegetation onto millions of pixels. The generated luminance map with high resolution can be down-sampled with downgraded resolution to speed up calculation. This is done during the steps S1 to S4 which together form an outside view calculation phase.

Then, during an illuminance calculation phase comprising several sub-steps S5, S6, ideally by making use of pre-quantified light transmission behavior of the involved shading device based on bi-directional transmittance function (BTDF), the EPD is able to compute the real-time workplane illuminance for defined regions at each position or state of the shading, employing multiplication of pre-computed daylighting matrices based on ray-tracing algorithm. In FIG. 4, this is visualized for the case where the shading device comprises a Venetian blind. The workplane illuminances are calculated between a maximum opening of the Venetian blind and a complete closing of the Venetian blind for different slate inclinations. Even if in FIG. 4 these illuminance calculations are shown for a Venetian blind, it is clear that similar illuminance calculations can be carried out for an electrochromic glazing. The different workplane illuminances will then not be calculated for different slate inclinations but rather for different opacities and/or transmittances.

The processor would check if any position or state of shading is within the constraint of 500-2000 lux work-plane illuminance (i.e. average workplane illuminance Eav). This is done during the illuminance check step S7. The constraint can be adjusted according to the occupants' preferences. The lower bound is to satisfy occupants' minimum requirement for working tasks, including reading, writing or drawing. If none of the illuminance states/values calculated during the illuminance calculation phase is within the constraint (that is, even for a fully opened state of the shading system, e.g. when the slats of a Venetian blind are fully retracted into the shading shell or when an electrochromic glazing is fully transparent), which means the sky light is too dark, the shading will be adjusted to the maximum opening in a maximum opening step S8 to allow maximal penetration of daylight. The upper bound is to avoid excessive daylighting on the work-plane, exceeding of which can contribute to excessive cooling load and visual discomfort.

Then—if step S8 has not been taken—the EPD generates the view images for occupants located inside a room adjacent to the shading device, wherein these occupants are looking toward the outside (i.e. through the shading device) from a 45' view angle to the facade, and computes the glare risk index (including daylight glare probability, abbreviated DGP), evaluating at each shading position or state within the previous constraint (i.e. for each calculated illuminance value for which the illuminance check step S7 did not yield a result lower than 500 lux or higher than 2000 lux). This glare evaluation is carried out during a glare evaluation phase comprising the sub-steps S9 to S12, namely the range selection step S9, the HDR view generation step S10, the DGP computation step S11 and the DGP test step S12. During the DGP test step, the method checks whether the daylight glare probability is below a certain threshold—in the case shown in FIG. 4 lower than 0.35.

The processor would optimize to select the largest opening of shading position, among the ones that satisfy both constraints of work-plane illuminance and glare risk, in an opening calculation step S14. If no position or state satisfies the two constraints, the Pareto optimization algorithm step S13 will be employed to find the compromised position of the shading. The steps S8, S14 and S13 together form a shading determination phase (even if only one of these steps is typically carried out because they are located in alternative logical paths).

Finally, in the shading system adjustment step S15, the EPD commands the actuator to adjust the shading to an optimal position or state of shading. This can be done by actuating the stepper motor accordingly (in the case of a Venetian blind) or by setting the appropriate voltage (in the case of an electrochromic glazing).

The method finishes with an idling step S16 during which the method pauses for a predefined time interval, e.g. 15 minutes. After that, the method restarts at start step S1.

In an embodiment, the described method is accomplished by a low-cost process, for instance a system on chip (SoC) field programmable gate array (FPGA), commonly within 6 to 9 minutes. With a more advanced computing unit, the time consumption can be shortened to 30 seconds or even less. The users are free to dilute the iteration to 15 min or 30 min, according to their preference. For fine tuning the tilt angle of Venetian blinds, the stepper motor can be employed to realize high resolution of angular movement and quietness as shown in FIG. 2, without disturbing occupants. For automating the electrochromic glazing, the procedure may be similar as for an embodiment with Venetian blinds, except for evaluating work-plane illuminance and glare at different tinted shades of the glass instead of different slate inclination angles.

The following advantages can be reached by means of the disclosure, according to at least one embodiment:

Integrated Design: Integrating everything in the shading itself without external components is convenient for installation and the room aesthetics or occupants' privacy are not biased.

Work-plane Illuminance regulation: dynamic control of work-plane illuminance in the range of 500-2000 lux is possible, thereby keeping the minimum requirement for working and avoiding excessive illumination (which would require a higher cooling load).

Environmental Glare Protection: dynamic control of the shading degree (for example slat angles or opacities of shading device) to avoid disturbing glare from the sun, or from specular reflections from surrounding buildings or vehicles—keeping the daylight glare probability (DGP)<0.35.

Quiet Fine Tuning (Tilt angle): the stepper motor is able to adjust the tilt angle of the slats of Venetian blinds for example at a 5 degree resolution with a noise level of less than 40 dB.

Saving in cost of sensors: typically only one image sensor (facing outside) for one room space is needed.

Saving in energy: energy saving in artificial lighting, heating and cooling load.

Independent of geographical position or time: a relative coordinate system makes the controller able to sense the relative position of the sun, clouds, and surrounding objects.

Quick Response: response in 6 to 9 min for shading control, possibility for sky condition prediction.

Compatible with IOT: convenient extension with internet of things (IOT).

In an embodiment of the disclosure, in order to address at least some issues of the prior art, an automated shading system is supplied, integrating an Embedded Photometric Device (abbreviated EPD, can also be referred to as an imaging and processing system) into the shading system itself, as shown in FIG. 1 (for Venetian blinds) and FIG. 3 (for electrochromic glazing). The EPD typically comprises a lens, an image sensor, processors and memory for computing. The EPD can be basically fixed anywhere on the shading, either on the shading shell or on the slats for Venetian blinds, and on the upper or bottom ridge of an electrochromic glass or glazing, with its lens facing towards the sky and outside landscape. The EPD is able to measure the directional luminance distribution of the sky and landscape. With a pre-defined model of the target building and quantified light transmission behavior of the shading device, in particular of the Venetian blind or the electrochromic glazing, the EPD is able to simulate the work-plane illuminance and evaluate the glare risk for occupants at positions of interest. Then, the optimal position or state of the shading system (for example an inclination angle of the slats or yet an opacity of the electrochromic glazing) can be calculated. In this way, the shading system according to the disclosure is able to automate the shading position or state to reach optimal daylighting provision in buildings and avoid glare for occupants, satisfying their visual comfort. As no external component is employed, the highly integrated automated shading system is easy to install in buildings, especially on building facades. Since the imaging system is facing outside instead of facing towards the occupants, it avoids the disturbance of occupants' privacy. In addition, for open-plan offices equipped with large area glazing, only one such system is able to evaluate daylighting provision and glare for multiple occupants independently, without using any indoor sensors.

In an embodiment of the disclosure, the shading device has an integrated design, with an imaging system, processors and actuators inside the shading device itself. The disclosure makes it possible to simulate the global conditions for targeted room space based on the monitored outside condition, which is then used to optimize the shading position or state to reach occupant visual comfort. This integrated design can be expected to lead to high user acceptance in terms of the installation and usage of the device.

The invention is not limited to the embodiments described here. The scope of protection is defined by the claims.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

1 Shading shell
2 Slats
3 Imaging system
4 Lens
5 Rotatory axis
6 Stepper motor
7 Reduction gearbox
D1, D2 Shading devices
E Electrochromic glazing
S1 . . . S16 Steps of method for illumination control
V Venetian blind

The invention claimed is:

1. Shading device configured to be integrated on a facade of a building wherein the shading device comprises an imaging system configured to exclusively create images of an outside view of the building, wherein the imaging system is integrated with the shading device, wherein the outside view comprises a sky portion and a landscape portion, and the imaging system comprises a lens and a processor, wherein the imaging system is configured to
determine a directional luminance distribution of the outside view comprising the sky portion and the landscape portion from the images of the outside view comprising the sky portion and the landscape portion;
compute a work-plane illuminance for a target work-plane inside a target room behind the shading device, at each position or state of the shading device, exclusively from the determined directional luminance distribution by making use of a pre-defined model of a target building and quantified light transmission behavior of the shading device, wherein the target work-plane is out of the field of view of the imaging system;
evaluate a glare risk for occupants inside the target room; and
determine an optimal position or state of the shading device which provides an optimal trade-off between work-plane illuminance and glare risk.

2. Shading device according to claim 1, wherein the shading device comprises a blind, wherein the blind is a Venetian blind or a vertical blind that comprises a multitude of slats, and the imaging system is configured to determine an optimal inclination angle or vertical position of the slats.

3. Shading device according to claim 2, wherein the shading device comprises a DC motor, wherein the DC motor is configured to tilt the slats of the Venetian blind around respective longitudinal axes of the slats, wherein the DC motor is configured to reach a tilt angle resolution of 10 degrees or less.

4. Shading device according to claim 3, wherein the DC motor is configured to reach a tilt angle resolution of 5 degrees or less.

5. Shading device according to claim 3, wherein the DC motor is configured to reach a tilt angle resolution of 3 degrees or less.

6. Shading device according to claim 2, wherein the shading device comprises a reduction gearbox and a rotatory axis, wherein the slats are mechanically connected to the rotatory axis, wherein the reduction gearbox is arranged between a drive shaft of a DC motor and the rotatory axis, such as to reduce a rotation angle of each step of the DC motor to a smaller rotation angle of the rotatory axis.

7. Shading device according to claim 6, wherein the slats are mechanically connected to the rotatory axis via a multitude of strings, chains, or both strings and chains.

8. Shading device according to claim 1, wherein the imaging system further comprises optical filters and an image sensor and an internal memory.

9. Shading device according to claim 1, wherein the shading device comprises an electrochromic glazing, and the imaging system is configured to determine an optimal opacity of the electrochromic glazing.

10. Facade comprising the shading device according to claim 1.

11. Method for illumination control, and for controlling a lighting system of a building, wherein the method uses the shading device according to claim 1, wherein the method comprises:
an outside view calculation phase and
an illuminance calculation phase, and
a glare evaluation phase, and
a shading determination phase, and
a shading system adjustment step,
wherein the different phases are periodically repeated, by means of an infinite loop.

12. Shading device according to claim 1, wherein the work-plane illuminance inside the target room is computed from the determined directional luminance distribution based on a ray-tracing algorithm or pre-computed matrices.

13. Shading device of claim 1, wherein the glare risk is evaluated by computing a glare risk index from the determined directional luminance distribution based on a ray-tracing algorithm or pre-computed matrices.

* * * * *